United States Patent
Zhang et al.

(10) Patent No.: US 12,224,805 B2
(45) Date of Patent: Feb. 11, 2025

(54) OPTICAL EMISSION APPARATUS, OPTICAL COMMUNICATION SYSTEM, AND OPTICAL COMMUNICATION METHOD

(71) Applicant: HUAWEI TECHNOLOGIES CO., LTD., Guangdong (CN)

(72) Inventors: Chunhui Zhang, Wuhan (CN); Shengyong Yan, Wuhan (CN); Lei Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 18/157,197

(22) Filed: Jan. 20, 2023

(65) Prior Publication Data

US 2023/0155687 A1    May 18, 2023

Related U.S. Application Data

(63) Continuation of application No. PCT/CN2021/094941, filed on May 20, 2021.

(30) Foreign Application Priority Data

Jul. 22, 2020 (CN) .......................... 202010714364.1

(51) Int. Cl.
*H04B 10/61* (2013.01)
*H04B 10/079* (2013.01)
*H04B 10/112* (2013.01)

(52) U.S. Cl.
CPC ..... *H04B 10/614* (2013.01); *H04B 10/07955* (2013.01); *H04B 10/112* (2013.01)

(58) Field of Classification Search
CPC ............ H04B 10/614; H04B 10/07955; H04B 10/112; H04B 10/2589; H04B 10/293;
(Continued)

(56) References Cited

U.S. PATENT DOCUMENTS

| 4,797,552 A | * | 1/1989 | Steel | G01T 1/2907 |
| | | | | 356/138 |
| 2020/0280772 A1 | * | 9/2020 | Yang | H04B 10/294 |
| 2021/0208473 A1 | * | 7/2021 | Jackel | H01S 3/06754 |

FOREIGN PATENT DOCUMENTS

WO    WO-2019057172 A1 *  3/2019  ........... H04B 10/079

OTHER PUBLICATIONS

J. K. Doylend, et al: "Hybrid silicon free-space source with integrated beam steering", Silicon Photonics VIII, vol. 8629, Mar. 14, 2013, total 9 pages.
(Continued)

*Primary Examiner* — Hibret A Woldekidan

(57) ABSTRACT

This application provides an optical emission apparatus, an optical communication system, and an optical communication method. Light beams of N optical emission units in the optical emission apparatus are adjusted, so that an optical power of entering an optical receiving apparatus is maximized, and impact of a speckle caused by turbulence is minimized, thereby improving receiving efficiency of an optical antenna. The optical emission apparatus includes a first optical splitter and N optical emission units, where N is an integer greater than 1; the first optical splitter is configured to transmit received same signal light to the N optical emission units; and the N optical emission units are configured to output the signal light from the first optical splitter, to obtain light beams distributed based on a preset proportion.

20 Claims, 7 Drawing Sheets

(58) Field of Classification Search
CPC .. H04B 10/294; H04B 10/2942; H04B 10/40; H04B 10/43; H04B 10/564; H04J 14/0221; H04J 14/02219; H04J 14/02216; G02F 1/35; G02F 1/3503
See application file for complete search history.

(56) References Cited

OTHER PUBLICATIONS

J. K. Doylend, et al: "Free-space Beam Steering in Two Dimensions Using aSilicon Optical Phased Array", IEEE Communications Surveys and Tutorials, Dec. 31, 2012, total 3 pages.
Yagiz Kaymak, et al: "A Survey on Acquisition, Tracking, and Pointing Mechanisms for Mobile Free-Space OpticalCommunications", IEEE Communications Surveys and Tutorials, Feb. 9, 2018, total 21 pages.
Chinese Office Action for Application No. 202010714364 dated Mar. 23, 2024, 41 pages.
PCT International Search Report for Application No. PCT/CN2021/094941 dated May 20, 2021, 9 pages.

* cited by examiner

OPTICAL EMISSION APPARATUS, OPTICAL COMMUNICATION SYSTEM, AND OPTICAL COMMUNICATION METHOD

CROSS-REFERENCE TO RELATED APPLICATIONS

PCT/CN2021/094941, filed on May 20, 2021, which claims priority to Chinese Patent Application No. 202010714364.1, filed on Jul. 22, 2020. The disclosures of the aforementioned applications are hereby incorporated by reference in their entireties.

This application is a continuation International Application No.

TECHNICAL FIELD

This application relates to the optical communications field, and more specifically, to an optical emission apparatus, an optical communication system, and an optical communication method.

BACKGROUND

Space optical communication is an important part of a future communication system, and an effective supplement to a current communication system. Coherent space optical communication is an important development direction of space optical communication.

In a coherent space optical communication system, coupling light in space into a single-mode fiber is always one of the main difficulties. Many factors affect coupling efficiency and stability of the single-mode fiber. First, an atmosphere exerts impact. After passing through the atmosphere, a light beam has a light intensity flicker, phase fluctuation, angle-of-arrival fluctuation, a light beam drift, or the like. Consequently, a focused spot shakes on an end face of the fiber, and an overlapping degree between a spot mode and a propagation mode in the fiber is low. Second, an environment exerts impact. For example, environmental vibration, a temperature drift, or the like leads to a relative motion of an optical antenna and an incident light beam, leading to a jitter of the focused spot on the end face of the fiber. In addition, a motion of an acquisition tracking and pointing (ATP) system further leads to a relative motion of the incident light beam and an optical antenna system. Especially, in a case of severe turbulence, a spatial light beam has a speckle phenomenon. When the spot reaches a receive end of the ATP system, the spot is enlarged by many times, and exceeds a receiving aperture of the ATP system.

Currently, an adaptive optical technology may be used to resolve problems such as a light intensity jitter and phase fluctuation, but cannot resolve the speckle problem.

SUMMARY

In view of the above, this application provides an optical emission apparatus, an optical communication system, and an optical communication method, to resolve the speckle problem and improve receiving efficiency of an optical antenna.

According to a first aspect, an optical emission apparatus is provided, including a first optical splitter, N optical emission units, where N is an integer greater than 1, and an adjustment unit. The first optical splitter is configured to transmit same signal light to the N optical emission units; the N optical emission units are configured to output the signal light from the first optical splitter, to obtain light beams distributed based on a preset proportion; and the adjustment unit is configured to adjust, based on returned optical power information, the light beams emitted by the N optical emission units.

The first optical splitter distributes the same signal light to the N optical emission units, and adjusts the light beams of the N optical emission units, so that an optical power of entering an optical receiving apparatus is maximized, and impact of a speckle caused by turbulence is minimized.

Optionally, the first optical splitter is specifically configured to: divide the signal light into N parts based on the preset proportion, and transmit the N parts to the N optical emission units, where the preset proportion is determined based on a preset model.

In this embodiment of this application, with reference to a specific structure of the optical emission apparatus, the optical emission apparatus adjusts, in a plurality of manners, the light beam emitted by the optical emission unit.

In this embodiment of this application, the optical emission apparatus adjusts, based on the optical power information, the light beam emitted by the optical emission unit, and may adjust each optical emission unit in real time. The optical power information is fed back to the optical emission apparatus through a low-speed backhaul channel.

In a possible implementation, the adjustment unit adjusts beam angles of the light beams emitted by the N optical emission units, so that an optical power of entering an optical receiving apparatus is maximized. Therefore, the optical emission apparatus adjusts a beam angle of each optical emission unit, so that the optical power of entering the optical receiving apparatus is maximized.

Optionally, the adjustment unit adjusts a beam angle of an $n^{th}$ optical emission unit in a first direction, and adjusts the beam angle of the $n^{th}$ optical emission unit in a second direction, where $1 \leq n < N$, and the first direction is perpendicular to the second direction; and the adjustment unit adjusts a beam angle of an $(n+1)^{th}$ optical emission unit in a third direction, and adjusts the beam angle of the $(n+1)^{th}$ optical emission unit in a fourth direction, where the third direction is perpendicular to the fourth direction. Therefore, the optical emission apparatus continuously adjusts beam angles of the N optical emission units in a polling manner, so that the optical power of entering the optical receiving apparatus always remains maximized, to minimize impact of the speckle caused by the turbulence.

Certainly, to accelerate an adjustment rate, the N optical emission units may alternatively be grouped into a plurality of groups, and a beam angle of one group of optical emission units is adjusted each time. In other words, the beam angle is adjusted by group.

In a possible implementation, each of the N optical emission units includes a driving apparatus, a tail fiber, and a lens: the driving apparatus is connected to the tail fiber, and is configured to push the tail fiber to change a location of the tail fiber, to adjust a beam angle of the optical emission unit; and a light beam output by the tail fiber reaches the lens, and the lens is configured to expand the light beam output by the tail fiber. Therefore, the optical emission unit can change the location of the tail fiber by using the driving apparatus, to adjust the beam angle.

Optionally, the driving apparatus may be implemented by using a piezoelectric driver. The piezoelectric driver has advantages such as a large driving force and precise control. In an application scenario of space optical communication in this embodiment of this application, a distance between an optical emission antenna and an optical receiving antenna is usually very large. Therefore, the beam angle of the optical emission unit requires a small adjustment range, and has a high precision requirement. Therefore, the piezoelectric driver can meet a requirement.

In a possible implementation, the optical emission apparatus further includes L phase modulators, and each phase modulator is connected to at least one optical emission unit; and the adjustment unit adjusts the L phase modulators, to change phases of the light beams emitted by the N optical emission units, so that the optical power of entering the optical receiving apparatus is maximized. Therefore, the optical emission apparatus can also adjust the phase in real time, to suppress the impact of the speckle.

Optionally, that the adjustment unit adjusts the L phase modulators includes: The adjustment unit adjusts an $l^{th}$ phase modulator, to adjust a phase of a light beam of an $n^{th}$ optical emission unit, where $1 \le l \le L$ and $1 \le n \le N$. Therefore, the optical emission apparatus continuously adjusts phases of the N optical emission units in a polling manner, so that the optical power of entering the optical receiving apparatus always remains maximized, to minimize the impact of the speckle caused by the turbulence.

In a possible implementation, the optical emission apparatus further includes H optical amplifiers, and each optical amplifier is connected to one or more of the N optical emission units; and the adjustment unit adjusts gains of the H optical amplifiers, to change optical output powers of the light beams emitted by the N optical emission units, so that the optical power of entering the optical receiving apparatus is maximized. Therefore, the optical emission apparatus can adjust the gain of the amplifier in real time, to suppress the impact of the speckle.

Optionally, the adjustment unit adjusts a gain of an $h^{th}$ optical amplifier, to change an optical output power of the light beam emitted by the $n^{th}$ optical emission unit, and the optical emission apparatus is configured to adjust a gain of an $(h+1)^{th}$ optical amplifier, to change an optical output power of a light beam emitted by the $(n+1)^{th}$ optical emission unit, where $1 \le h < H$ and $1 \le n < N$.

A manner of "adjusting the gain of the optical amplifier" may not only be implemented independently, but also may be implemented in combination with a manner of "adjusting the beam angle" or "adjusting the phase". This is not limited in embodiments of this application.

In an implementation, for a manner in which the optical emission apparatus adjusts the beam angle of the optical emission unit, the optical amplifier may be further added to the optical emission apparatus to adjust the gain. In other words, the optical emission apparatus includes at least one optical amplifier and a plurality of optical emission units whose beam angles are adjustable. Certainly, in the optical emission apparatus, one optical amplifier may be connected to one or more optical emission units whose beam angles are adjustable. This is not specifically limited in embodiments of this application.

In another implementation, for a manner in which the optical emission apparatus adjusts the phase of the optical emission unit, the optical amplifier may be further added to the optical emission apparatus to adjust the gain. In other words, the optical emission apparatus includes at least one optical amplifier and at least one phase modulator. Certainly, in the optical emission apparatus, one optical amplifier may be connected to one or more phase modulators. This is not specifically limited in embodiments of this application.

According to a second aspect, an optical transceiver apparatus is provided. The optical transceiver apparatus includes the optical emission apparatus in the first aspect, an optical receiving apparatus, a second optical splitter, and a photodetector. The optical receiving apparatus is configured to: receive a light beam emitted by a peer-end optical transceiver apparatus, and transmit the light beam to the second optical splitter: the second optical splitter is configured to: perform an optical split on the light beam emitted by the peer-end optical transceiver apparatus, and transmit, to the photodetector, a first partial light beam obtained after the optical split; and the photodetector is configured to: detect an optical power of the first partial light beam obtained by the second optical splitter through the split, and return optical power information to the peer-end optical transceiver apparatus.

According to a third aspect, an optical communication system is provided, including: the optical emission apparatus according to any implementation of the first aspect, an optical receiving apparatus, a second optical splitter, and a photodetector. The optical emission apparatus is configured to transmit signal light: the optical receiving apparatus is configured to: receive the signal light, and transmit the signal light to the second optical splitter: the second optical splitter is connected to the optical receiving apparatus, and is configured to: perform an optical split on a light beam received from the optical receiving apparatus, and transmit, to the photodetector, a first partial light beam obtained after the optical split: the photodetector is connected to the second optical splitter, and is configured to detect optical power information of the first partial light beam; the optical emission apparatus is connected to the photodetector by using a backhaul channel, and the backhaul channel is configured to transmit the optical power information detected by the photodetector to the optical emission apparatus; and the optical emission apparatus includes a first optical splitter and N optical emission units, and the optical emission apparatus is configured to adjust, based on the optical power information, light beams emitted by the N optical emission units, so that optical power of entering the optical receiving apparatus is maximized.

As turbulence continuously changes, the optical communication system in this embodiment of this application continuously adjusts an emission unit of an adjustable multicore optical antenna, so that an optical power clock of entering an optical receiving antenna is kept to have a large value, to minimize impact of a speckle caused by turbulence.

Optionally, the backhaul channel is a low-speed backhaul channel. A reason is that a transmission speed of returning the optical power information is not fast. Therefore, a lower modulation rate and an algorithm with a large quantity of redundant bits may be used for the low-speed backhaul channel, to implement stable transmission on a long-distance bad channel.

According to a fourth aspect, an optical communication method is provided, including: controlling a first optical splitter to transmit same signal light to N optical emission units, where the N optical emission units output the signal light from the first optical splitter, to obtain light beams distributed based on a preset proportion, and N is an integer greater than 1: receiving returned optical power information; and adjusting, based on the optical power information, N light beams emitted by the N optical emission units, so that an optical power of entering an optical receiving apparatus is maximized, and impact of a speckle caused by turbulence is minimized.

Optionally, the adjusting N light beams emitted by the N optical emission units includes: adjusting beam angles of the light beams emitted by the N optical emission units.

Optionally, the adjusting N light beams emitted by the N optical emission units includes: adjusting phases of the light beams emitted by the N optical emission units.

Optionally, the adjusting N light beams emitted by the N optical emission units further includes: adjusting gains of the light beams emitted by the N optical emission units.

According to a fifth aspect, a computer-readable medium is provided, configured to store a computer program. The computer program includes instructions used to perform the method in the fourth aspect.

DESCRIPTION OF EMBODIMENTS

The following describes technical solutions of this application with reference to the accompanying drawings.

The technical solutions in embodiments of this application may be applied to a scenario in which long-distance optical communication is performed, large-capacity optical communication is performed, or optical communication that is greatly affected by a severe environment (for example, a desert or an ocean) is performed. For example, in this application, long-distance (tens of kilometers or even hundreds of kilometers) optical communication may be supported.

Figure 1:
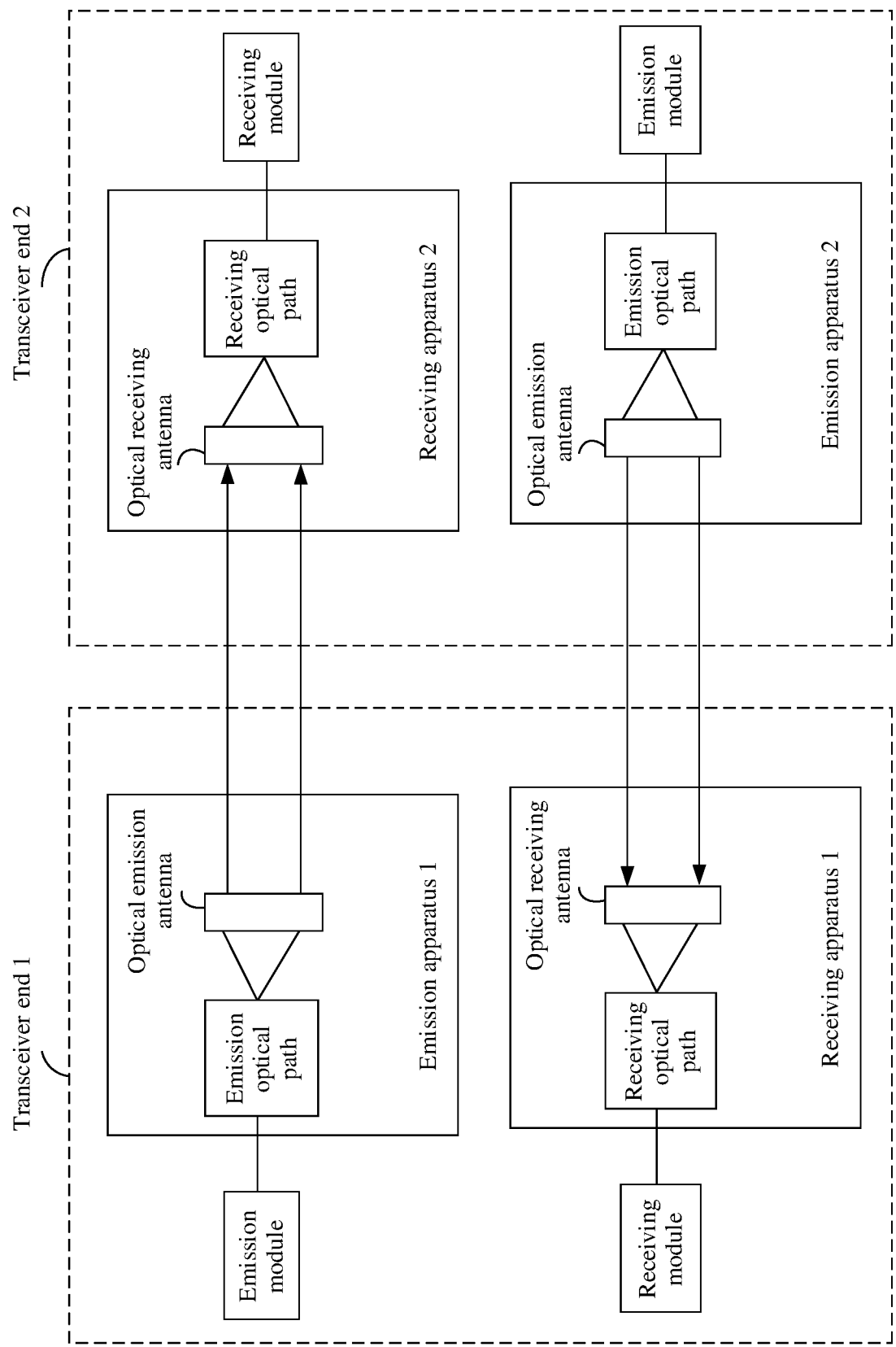
FIG. 1 is an example diagram of an architecture of an optical communication system to which an embodiment of this application is applied.

FIG. 1 is an example diagram of an architecture of an optical communication system to which an embodiment of this application is applied. As shown in FIG. 1, the architecture includes a transceiver end 1 and a transceiver end 2. Each transceiver end has an emission function and a receiving function, and the transceiver end 1 and the transceiver end 2 each are a peer transceiver end of each other.

An upper part of FIG. 1 shows an architecture in which the transceiver end 1 emits light to the transceiver end 2. As shown in the upper part of FIG. 1, the transceiver end 1 includes an emission module and an emission apparatus 1 (the emission apparatus 1 includes an emission optical element and an optical emission antenna). The transceiver end 2 includes a receiving module and a receiving apparatus 2 (the receiving apparatus 2 includes a receiving optical element and an optical receiving antenna). The emission module of the transceiver end 1 modulates an optical signal, loads the signal onto light, and then emits the signal by using the emission apparatus 1. A light beam transmitted from the transceiver end 1 is received by the receiving apparatus 2 and coupled into a single-mode fiber, and enters an optical detection module or an optical amplifier. In the entire system, the emission apparatus and the receiving apparatus become different due to a changes in a channel, and the other parts are basically the same as a structure of a fiber system. In other words, an emission apparatus and a receiving apparatus adapted to a spatial channel are cores of a space optical communication hardware system, and are responsible for alleviating impact of light beam jitter caused by atmospheric turbulence on the spatial channel and jitter of the emission apparatus and the receiving apparatus, to ensure receiving efficiency of the single-mode fiber.

A lower part of FIG. 1 shows an architecture in which the transceiver end 1 receives light from the transceiver end 2. As shown in the lower part of FIG. 1, the transceiver end 1 includes a receiving module and a receiving apparatus 1 (the receiving apparatus 1 includes a receiving optical element and an optical receiving antenna). The transceiver end 2 includes an emission module and an emission apparatus 2 (the emission apparatus 2 includes an emission optical element and an optical emission antenna). The emission module of the transceiver end 2 modulates an optical signal, loads the signal onto light, and then emits the signal by using the emission apparatus 2. A light beam transmitted from the transceiver end 2 is received by the receiving apparatus 1 and coupled into a single-mode fiber, and enters an optical detection module or an optical amplifier.

Current adaptive optics may compensate for phase distortion caused by turbulence, but cannot resolve a problem of a speckle caused by the turbulence.

In view of this, this application provides an optical emission apparatus (which may also be referred to as an adjustable multicore optical antenna), to adjust signal light in real time, effectively suppress the problem of the speckle caused by the turbulence, and minimize impact of the speckle caused by the turbulence.

The optical emission apparatus provided in this application may replace the optical emission antenna of the transceiver end 1 in FIG. 1, the transceiver end 1 in FIG. 1, or the emission apparatus 1 in FIG. 1: or may replace the optical emission antenna of the transceiver end 2 in FIG. 1, the transceiver end 2 in FIG. 1, or the emission apparatus 2.

Figure 2:
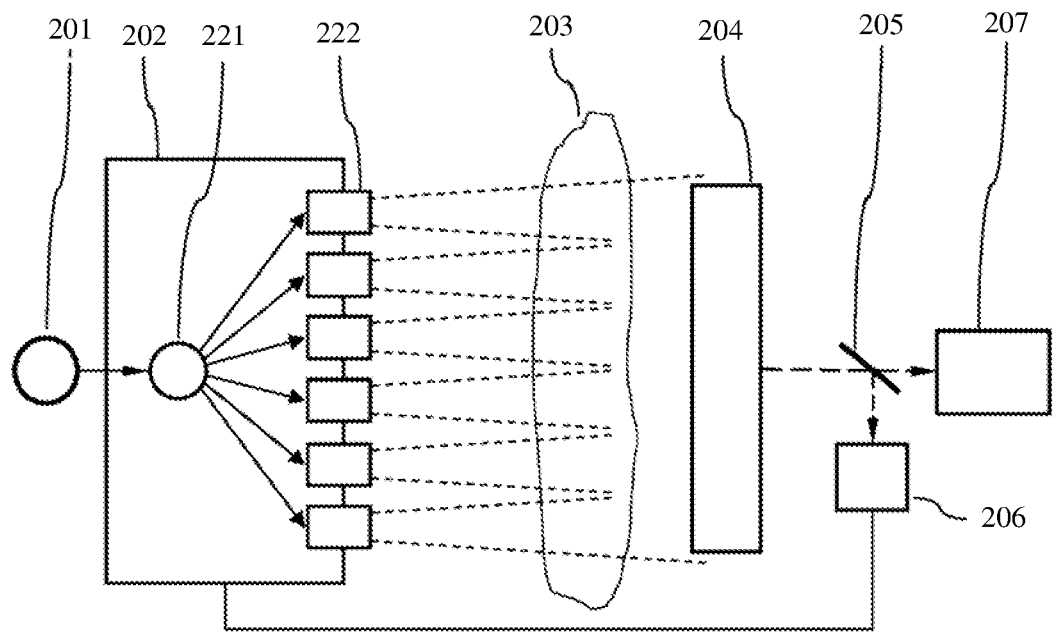
FIG. 2 is a schematic diagram of an architecture of an optical communication system according to an embodiment of this application.

FIG. 2 is a schematic diagram of an optical communication system according to an embodiment of this application. As shown in FIG. 2, the optical communication system includes an optical emission apparatus 202, configured to emit signal light 201. The optical emission apparatus 202 includes a first optical splitter 221 and a plurality of optical emission units 222. Signal light beams emitted by the plurality of optical emission units are usually affected by turbulence 203. A receive end includes: an optical receiving apparatus 204, configured to receive the signal light beams: a second optical splitter 205, configured to allocate a part of the received signal light beams to a photodetector 206: the photodetector 206 is configured to: detect an optical power of the allocated light beams, and return optical power information to an emission end; and a signal receiving and processing apparatus 207, configured to process received signal light. The signal receiving and processing apparatus 207 may include a wavefront phase adjustment apparatus, an optical coupling apparatus, and the like. Usually, the optical coupling apparatus may include one or more lenses and tail fibers.

Specifically, after receiving the signal light, the optical emission apparatus splits the signal light into N parts (N is an integer greater than 1) by using the first optical splitter, respectively transmits the N parts to N optical emission units, and transmits the signal light to space by using the N optical emission units. Herein, light beams of the N optical emission units are from same signal light. The light beams emitted by the N optical emission units are distributed based on a preset proportion, and the preset proportion is determined based on a preset model. For example, distribution based on the preset model may include distributing according to a Gaussian distribution, an orbital angular momentum (OAM) modulation distribution, or another long-distance and stable distribution manner. Optionally, the first optical splitter is specifically configured to split the signal light into the N parts based on the preset proportion, and the preset proportion may also be considered as a preset model.

It should be understood that the first optical splitter may also be implemented in another manner, provided that the signal light can be split into the N parts (further, into the N parts based on the preset proportion), and the N parts are respectively transmitted to the N optical emission units, so that light beams output by the N optical emission units are distributed based on the preset proportion. A specific form of the first optical splitter is not limited in example embodiment of this application. An optical splitter (the first optical splitter or the second optical splitter) in this application may be an optical splitter such as a fiber optical splitter or a space optical splitter.

The optical emission apparatus transmits, to the optical receiving apparatus, the signal light distributed based on the preset proportion. After receiving the signal light, the optical receiving apparatus shrinks a light beam of the received signal light, so that the signal light arrives at the second optical splitter.

The second optical splitter is configured to: perform an optical split on the signal light received by the optical receiving apparatus, transmit, to the photodetector, a part of the light beams obtained after the optical split, and continue to propagate the other part of the light beams to the signal receiving and processing apparatus 207. For ease of description, a light beam transmitted to the photodetector after the optical split is referred to as a first partial light beam herein, and a remaining light beam (namely; a light beam transmitted to the signal receiving and processing apparatus 207) other than the first partial light beam after the optical split is referred to as a second partial light beam.

The photodetector 206 is configured to detect an optical power information of the first partial light beam. The photodetector is connected to the optical emission apparatus by using a backhaul channel. Optionally, the backhaul channel is a low-speed backhaul channel. A reason is that a transmission speed of returning the optical power information does not need to be fast. Therefore, an algorithm with a lower modulation rate and a large quantity of redundant bits may be used for the low-speed backhaul channel, to implement stable transmission on a long-distance channel which may be a bad channel.

The low-speed backhaul channel is configured to feed back, to the optical emission apparatus, the optical power information detected by the photodetector. Optionally, the low-speed backhaul channel may be implemented by using a low-speed space optical channel, or may be implemented by using a low-speed microwave channel. This is not specifically limited in example embodiments of this application.

After the optical emission apparatus and the optical receiving apparatus are aligned, the N optical emission units of the optical emission apparatus may be adjusted. A specific adjustment manner is described subsequently. The optical emission apparatus adjusts the N optical emission units in real time based on optical power information returned by the low-speed backhaul channel (or referred to as beacon light), so that the optical power detected by the photodetector is maximized. If the optical power detected by the detector is maximized, an optical power of entering the optical receiving apparatus also has a maximum value. In a communication link establishment process, as turbulence continuously changes, the optical communication system continuously adjusts the N emission units of the optical emission apparatus, so that the optical power of entering the optical receiving apparatus is always kept to have a large value, to minimize impact of a speckle caused by the turbulence.

The problem of the speckle is especially serious under a condition of strong turbulence. A speckle arriving at the transceiver end may even be one order larger than an aperture of the optical receiving apparatus, and a diameter may be several meters, causing a great loss of the optical power. Based on the optical emission apparatus in this application, the impact of the speckle can be effectively reduced, and receiving efficiency can be improved.

It may be understood that the schematic diagram in FIG. 2 is merely for ease of understanding, and does not constitute a limitation on a protection scope of embodiments of this application.

The following provides a schematic diagram of an optical emission apparatus and a light beam distribution in example embodiments of this application.

Figure 3:
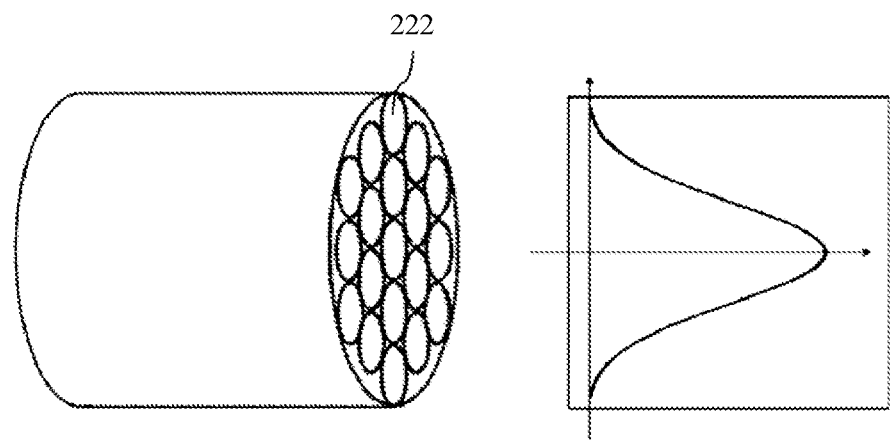
FIG. 3 is an example diagram of an optical emission apparatus and a distribution of a light beam emitted by the optical emission apparatus according to an embodiment of this application.

FIG. 3 is an example diagram of an optical emission apparatus and a distribution of a light beam emitted by the optical emission apparatus according to this application. As shown in a left figure in FIG. 3, the optical emission apparatus may include a plurality of optical emission units 222. Each optical emission unit is independent and adjustable. An optical power of each optical emission unit is preset, so that a power of the light beam emitted by the optical emission apparatus may satisfy a Gaussian distribution or approximate to Gaussian distribution, and a specific optical distribution is shown in a right figure in FIG. 3. Light beams emitted by all the optical emission units are from same signal light. A plurality of light beams emitted by the optical emission apparatus by using the plurality of optical emission units are aggregated into a beam of light in space, and the beam of light is emitted to the optical receiving apparatus.

In this embodiment of this application, with reference to a specific structure of the optical emission apparatus, the optical emission apparatus adjusts, in a plurality of manners, the light beam emitted by the optical emission unit. In other words, different optical emission apparatuses correspond to different adjustment manners. The following separately describes the manners.

Manner 1

The optical emission apparatus adjusts beam angles of light beams emitted by N optical emission units, so that an optical power of entering the optical receiving apparatus is maximized.

Figure 4:
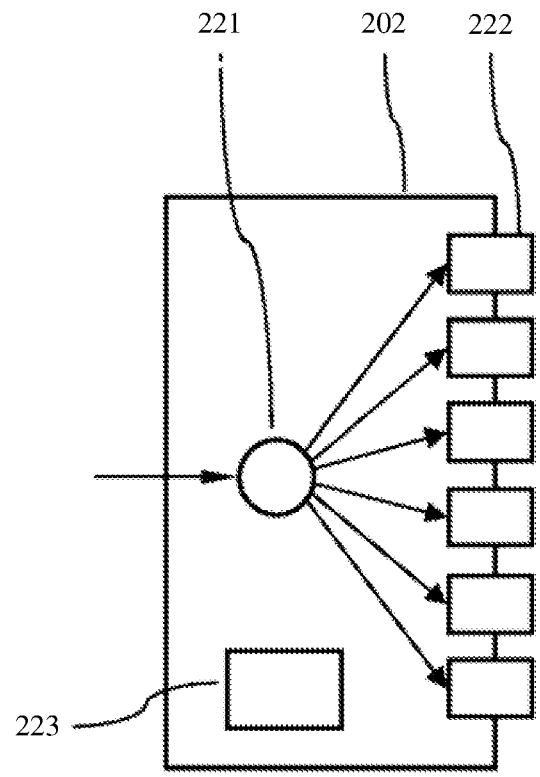
FIG. 4 is an example diagram of a structure of an optical emission apparatus according to an embodiment of this application.
Figure 5:
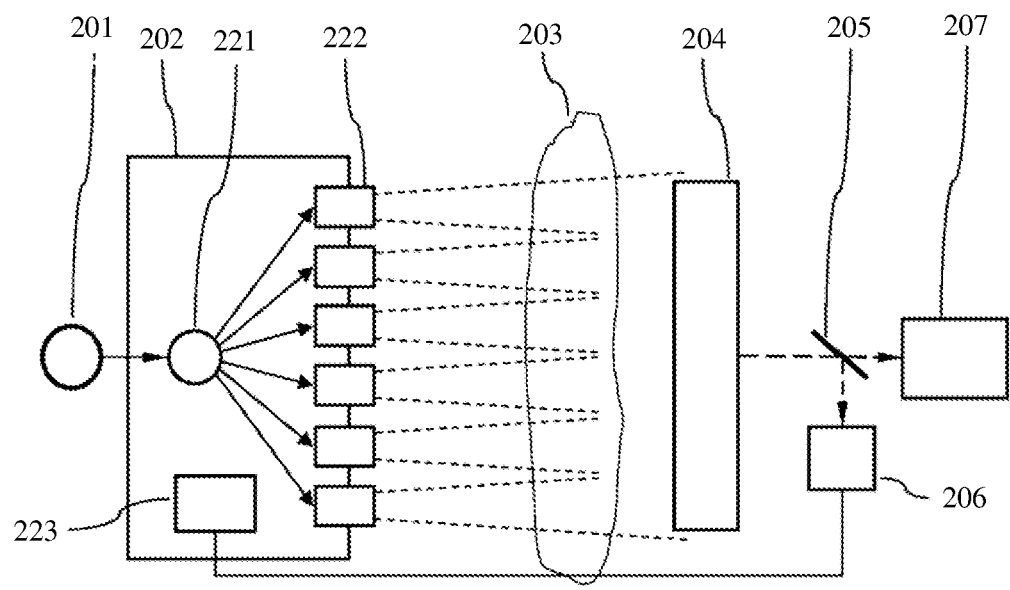
FIG. 5 is a diagram of an architecture of an optical communication system to which the optical emission apparatus in FIG. 4 is applied.

For example, FIG. 4 is a schematic diagram of a structure of the optical emission apparatus in Manner 1. An optical emission apparatus 202 includes a first optical splitter 221 and N optical emission units 222 with an adjustable beam angle, and further includes an adjustment unit 223, configured to adjust, based on returned optical power information, the light beams emitted by the N optical emission units. The first optical splitter is configured to split signal light entering the optical emission apparatus into N parts (or into the N parts based on a preset proportion), and is separately connected to the N optical emission units. A beam angle of each optical emission unit is independent and adjustable. After the signal light enters the optical emission apparatus, the signal light is split into the N parts (or into the N parts based on the preset proportion), and the N parts respectively enter the N optical emission units. The preset proportion is a preset optical split proportion. The preset proportion is preset based on the following principle: It is ensured that an optical power of entering a middle optical emission unit in the N optical emission units is large, and an optical power of an edge optical emission unit is small. In other words, light emitted by the optical emission apparatus approximates to a Gaussian distribution. FIG. 5 is a diagram of an architecture in which the optical emission apparatus in FIG. 4 is applied to an optical communication system. The adjustment unit 223 is included in FIG. 5. The adjustment unit 223 adjusts, based on optical power information that is returned by a backhaul channel and that is received by a receive end, the angles of the light beams emitted by the N optical emission units.

Optionally; that the optical emission apparatus is configured to adjust the beam angles of the light beams emitted by the N optical emission units includes: The optical emission apparatus adjusts a beam angle of an $n^{th}$ optical emission unit in a first direction, and adjusts the beam angle of the $n^{th}$ optical emission unit in a second direction, where $1 \leq n < N$, and the first direction is perpendicular to the second direction; and the optical emission apparatus adjusts a beam angle of an $(n+1)^{th}$ optical emission unit in a third direction, and adjusts the beam angle of the $(n+1)^{th}$ optical emission unit in a fourth direction, where the third direction is perpendicular to the fourth direction.

The first direction and the second direction are two directions in which a light output direction of the $n^{th}$ optical emission unit is deflected. The third direction and the fourth direction are two directions in which a light output direction of the $(n+1)^{th}$ optical emission unit is deflected.

In other words, the optical emission apparatus sequentially adjusts beam angles of the N optical emission units. The optical emission apparatus adjusts each optical emission unit in two perpendicular directions.

For example, it may be assumed that numbers of the N optical emission units are from 1 to N. An optical emission unit whose number is 1 (referred to as an optical emission unit 1) is used as an example. The optical emission apparatus controls a light beam exit direction of the optical emission unit 1 to be adjusted based on a minimum step in an X+ direction. If a receiving optical power (the receiving optical power is an optical power of the optical receiving apparatus, and is not separately explained below) increases, the light beam exit direction continues to be adjusted in the X+ direction: or if a receiving optical power decreases, the light beam exit direction is adjusted in an X− direction, until the receiving optical power is maximized. Then, the optical emission apparatus controls the light beam exit direction of the optical emission unit 1 to be adjusted based on a minimum step in a Y+ direction. If the receiving optical power increases, the light beam exit direction continues to be adjusted in the Y+ direction: or if the receiving optical power decreases, the light beam exit direction is adjusted in a Y− direction, until the receiving optical power is maximized. The optical emission apparatus sequentially adjusts, in an adjustment manner of the optical emission unit whose number is 1, beam angles of optical emission units whose numbers are from 2 to N. The optical emission unit obtains optical power information of the optical receiving apparatus in real time from a low-speed backhaul channel, to learn, through comparison, of whether the receiving optical power increases after adjustment.

Alternatively, to improve an adjustment speed, a plurality of adjacent optical emission units in the N optical emission units may be used as one group, and the beam angle is adjusted by group. In other words, the optical emission apparatus may adjust a beam angle of one group of optical emission units each time, to accelerate an adjustment rate.

For example, the N optical emission units are grouped into M groups, and the N optical emission units include M groups of optical emission units. Each of the M groups of optical emission units may include a same quantity of optical emission units, or may include a different quantity of optical emission units. This is not limited in embodiments of this application. For example, the N optical emission units may be evenly grouped into M groups, and each group includes adjacent optical emission units and includes a same quantity of adjacent optical emission units. For another example, the N optical emission units may be grouped into M groups, and quantities of adjacent optical emission units included in all groups may be partially the same and partially different, or may all be different.

Optionally, that the optical emission apparatus adjusts the beam angles of the light beams emitted by the N optical emission units includes: The optical emission apparatus adjusts a beam angle of an $m^{th}$ group of optical emission units in the fourth direction, and adjusts the beam angle of the $m^{th}$ group of optical emission units in a fifth direction, where $1 \leq m < M$, and the fourth direction is perpendicular to the fifth direction; and the optical emission apparatus adjusts a beam angle of an $(m+1)^{th}$ group of optical emission units in a sixth direction, and adjusts the beam angle of the $(m+1)^{th}$ group of optical emission units in a seventh direction, where the sixth direction is perpendicular to the seventh direction.

In other words, the optical emission apparatus sequentially adjusts beam angles of the M optical emission units. The optical emission apparatus adjusts each group of optical emission units in two perpendicular directions. For example, it may be assumed that the N optical emission units are grouped into M groups, and group numbers are sequentially from 1 to M. An optical emission unit whose group number is 1 (referred to as a group 1 of optical emission units) is used as an example. The optical emission apparatus controls a light beam exit direction of the group 1 of optical emission units to be adjusted based on the minimum step in the X+ direction. If the receiving optical power increases, the light beam exit direction continues to be adjusted in the X+ direction: or if the receiving optical power decreases, the light beam exit direction is adjusted in the X− direction, until the receiving optical power is maximized, where X+ and X− are reverse directions of each other. Then, the optical emission apparatus controls the light beam exit direction of the group 1 of optical emission units to be adjusted based on the minimum step in the Y+ direction. If the receiving optical power increases, the light beam exit direction continues to be adjusted in the Y+ direction: or if the receiving optical power decreases, the light beam exit direction is adjusted in the Y− direction, until the receiving optical power is maximized, where Y+ and Y− are reverse directions of each other. The optical emission apparatus sequentially adjusts, in an adjustment manner of the optical emission unit whose group number is 1, beam angles of optical emission units whose group numbers are from 2 to M.

Therefore, in Manner 1, the beam angle of each optical emission unit is adjusted in real time, so that the receiving optical power of the optical receiving apparatus is maximized, to suppress impact of a speckle.

In Manner 1, the optical emission apparatus can adjust the beam angle of the optical emission unit in real time based on the optical power information returned by the low-speed backhaul channel, to suppress the impact of the speckle.

Manner 2

The optical emission apparatus adjusts phases of light beams emitted by N optical emission units, so that an optical power of entering the optical receiving apparatus is maximized. In Manner 2, the optical emission apparatus may include L phase modulators, and each phase modulator is connected to at least one optical emission unit. One phase modulator may correspond to one or more optical emission units. This is not limited in example embodiments of this application.

For example, the optical emission apparatus includes a first optical splitter, the L phase modulators, and the N optical emission units. Each phase modulator is independent and adjustable. After the signal light enters the optical emission apparatus, the signal light is split into L parts (or split into the L parts based on a preset proportion), the L parts respectively enter the L phase modulators, and the L phase modulators are connected to the N optical emission units. A value of L may be the same as or different from a value of N. The preset proportion is a preset optical split proportion. The preset proportion is preset based on the following principle: It is ensured that an optical power of entering a middle optical emission unit in the N optical emission units is large, and an optical power of an edge optical emission unit is small. In other words, light emitted by the optical emission apparatus approximates to a Gaussian distribution. In Manner 2, phases of the L phase modulators are adjusted, so that the optical power of entering the optical receiving apparatus is maximized.

Optionally, the first optical splitter is specifically configured to split, based on the preset proportion, the signal light entering the optical emission apparatus into the L parts, and is separately connected to the L phase modulators, and the L phase modulators are connected to the N optical emission units. A value of L may be the same as or different from a value of N. This is not limited in embodiments of this application. For example, if the value of L is the same as the value of N, one phase modulator is connected to one optical emission unit; and if the value of L is different from the value of N, one phase modulator may be connected to a plurality of optical emission units.

Figure 6:
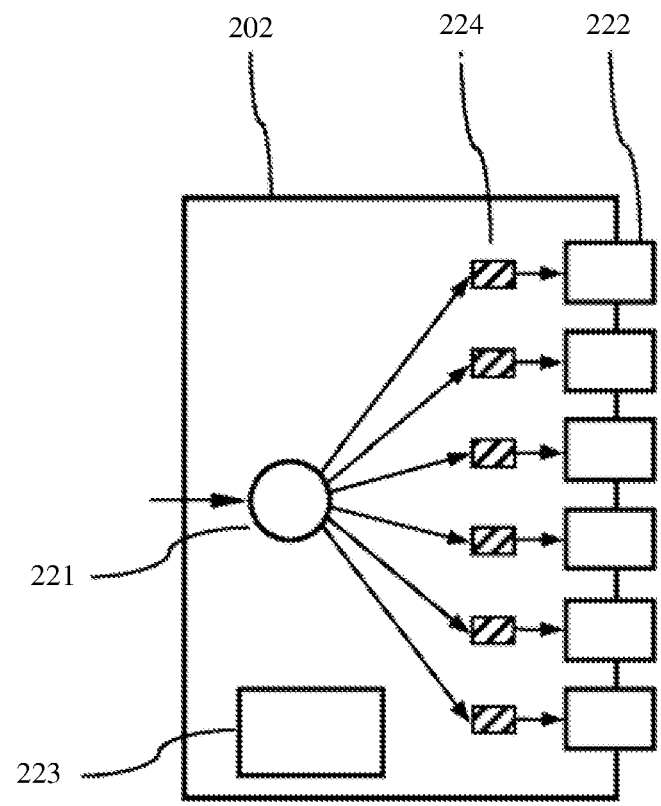
FIG. 6 is an example diagram of another structure of an optical emission apparatus according to an embodiment of this application.
Figure 7:
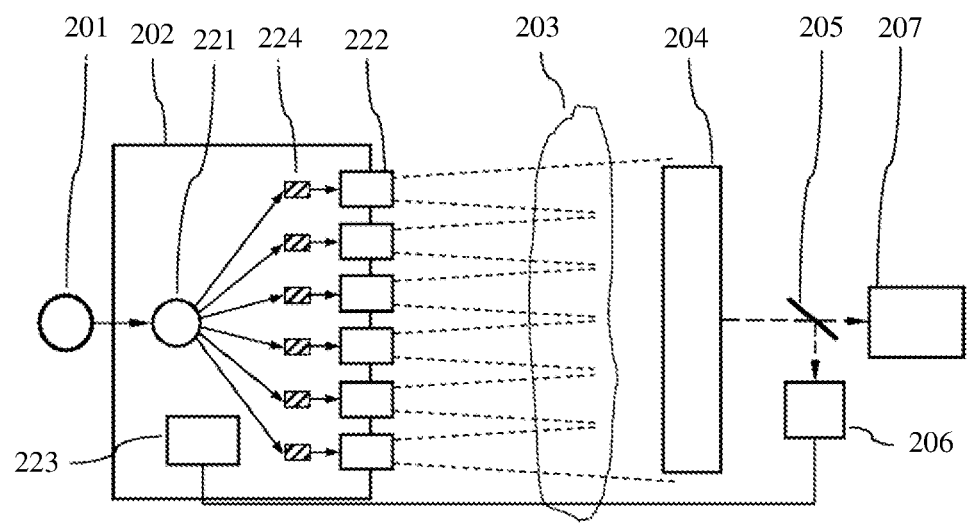
FIG. 7 is a diagram of another architecture of an optical communication system to which the optical emission apparatus in FIG. 6 is applied.

In an example embodiment, it is assumed that a quantity of phase modulators is the same as a quantity of optical emission units, each quantity is N, and one phase modulator is connected to one optical emission unit. FIG. 6 is an example diagram of a structure of the optical emission apparatus in Manner 2. As shown in FIG. 6, an optical emission apparatus 202 includes a first optical splitter 221, a plurality of phase modulators 224, and a plurality of optical emission units 222, and further includes an adjustment unit 223, configured to adjust, based on returned optical power information, the light beams emitted by the N optical emission units. After splitting the signal light into a plurality of parts, the first optical splitter is separately connected to each phase modulator. One phase modulator is connected to one optical emission unit. A difference between FIG. 6 and FIG. 4 is that the phase modulator is added. FIG. 7 is a diagram of another architecture in which the optical emission apparatus in FIG. 6 is applied to an optical communication system.

Optionally, that the optical emission apparatus adjusts the L phase modulators, to change the phases of the light beams emitted by the N optical emission units, so that the optical power of entering the optical receiving apparatus is maximized includes: The optical emission apparatus adjusts an $l^{th}$ phase modulator, to adjust a phase of a light beam of an $n^{th}$ optical emission unit, where $1 \le l < L$ and $1 \le n < N$.

For example, it may be assumed that both the quantity of phase modulators and the quantity of optical emission units are N, numbers of the N optical emission units are from 1 to N, numbers of the N phase modulators are from 1 to N, and a phase modulator whose number is 1 is connected to an optical emission unit whose number is 1. The optical emission unit whose number is 1 is used as an example. The optical emission apparatus adjusts the phase modulator whose number is 1, to increase a phase delay of light emitted by the optical emission unit whose number is 1. Such adjustment is performed, so that if the optical power of the optical receiving apparatus increases, a phase delay of the optical emission unit 1 continues to increase, and if the optical power of the optical receiving apparatus decreases, the phase delay of the optical emission unit 1 is reduced, until the optical power of the optical receiving apparatus is maximized. The optical emission apparatus sequentially adjusts optical emission units with the other numbers in a phase adjustment manner of the optical emission unit whose number is 1, to adjust a power of the optical emission units with the other numbers, until the optical power of the optical receiving apparatus is maximized. The optical emission unit obtains the optical power information of the optical receiving apparatus in real time from the low-speed backhaul channel, to learn, through comparison, of whether the optical power of the optical receiving apparatus increases after adjustment.

Therefore, in a communication link establishment process, as the turbulence continuously changes, the optical communication system continuously adjusts a phase delay of each phase modulator in the optical emission apparatus in a polling manner in Manner 2, so that the optical power of entering the optical receiving apparatus is always kept to have a large value, to minimize the impact of the speckle caused by the turbulence.

Alternatively, a plurality of adjacent optical emission units in the N optical emission units may be used as one group, and a phase of one group of optical emission units is adjusted by group, to accelerate an adjustment rate.

For example, the N optical emission units are grouped into P groups, and the N optical emission units include P groups of optical emission units. Each group of optical emission units may correspond to one phase modulator.

Each of the P groups of optical emission units may include a same quantity of optical emission units, or may include a different quantity of optical emission units. This is not limited in embodiments of this application. For example, the N optical emission units may be evenly grouped into P groups, and each group includes adjacent optical emission units and includes a same quantity of adjacent optical emission units. For another example, the N optical emission units may be grouped into P groups, and quantities of adjacent optical emission units included in all groups may be partially the same and partially different, or may all be different.

Optionally, the optical emission apparatus adjusts the $l^{th}$ phase modulator, to change a phase delay of a light beam emitted by a $p^{th}$ group of optical emission units, where $1 \leq l < L$ and $1 \leq p \leq P$.

In other words, the optical emission apparatus sequentially adjusts phases of the P groups of optical emission units, until the optical power of the optical receiving apparatus is maximized. The optical emission apparatus adjusts a phase of each group of optical emission units. For example, it may be assumed that the N optical emission units are grouped into the P groups, and group numbers are sequential from 1 to P. An optical emission unit whose group number is 1 is used as an example. The optical emission apparatus adjusts a phase modulator corresponding to a group 1 of optical emission units, to increase a phase delay of the group 1 of optical emission units. Such adjustment is performed, so that if the optical power of the optical receiving apparatus increases, the phase delay of the group 1 of optical emission units continues to increase, and if the optical power of the optical receiving apparatus decreases, the phase delay of the group 1 of optical emission units is reduced, until the optical power of the optical receiving apparatus is maximized. The optical emission apparatus sequentially adjusts, in a phase adjustment manner of the optical emission unit whose group number is 1, phases of optical emission units whose group numbers are from 2 to P.

Therefore, in Manner 2, the phase of the optical emission unit is adjusted in real time, so that the receiving optical power of the optical receiving apparatus is maximized, to suppress the impact of the speckle.

Optionally, the optical emission apparatus may further include H optical amplifiers, and each optical amplifier is connected to at least one optical emission unit. One optical amplifier may correspond to one or more optical emission units. This is not limited in embodiments of this application.

The optical emission apparatus adjusts gains of the H optical amplifiers, to change optical output powers of the light beams emitted by the N optical emission units, so that the optical power of entering the optical receiving apparatus is maximized.

Specifically, the optical emission apparatus includes H optical amplifiers, and a gain of each optical amplifier is independent and adjustable. After the signal light enters the optical emission apparatus, the signal light is split into H parts (or split into the H parts based on the preset proportion), the H parts respectively enter the H optical amplifiers, and after being amplified by the H optical amplifiers, the H parts respectively enter the N optical emission units. A value of H may be the same as or different from a value of N. This is not limited in embodiments of this application. The preset proportion is a preset optical split proportion. The preset proportion is preset based on the following principle: It is ensured that an optical power of entering a middle optical emission unit in the N optical emission units is large, and an optical power of an edge optical emission unit is small. In other words, light emitted by the optical emission apparatus approximates to a Gaussian distribution. In Manner 2, gains of the H optical amplifiers are adjusted, so that the optical power of entering the optical receiving apparatus is maximized.

Optionally, the optical emission apparatus may include a first optical splitter. The first optical splitter is configured to split, based on the preset proportion, the signal light entering the optical emission apparatus into the H parts, and is separately connected to the H optical amplifiers, and the H optical amplifiers are connected to the N optical emission units. A value of H may be the same as or different from a value of N. This is not limited in embodiments of this application. For example, if the value of H is the same as the value of N, one optical amplifier is connected to one optical emission unit; and if the value of H is different from the value of N, one optical amplifier may be connected to a plurality of optical emission units.

Figure 8:
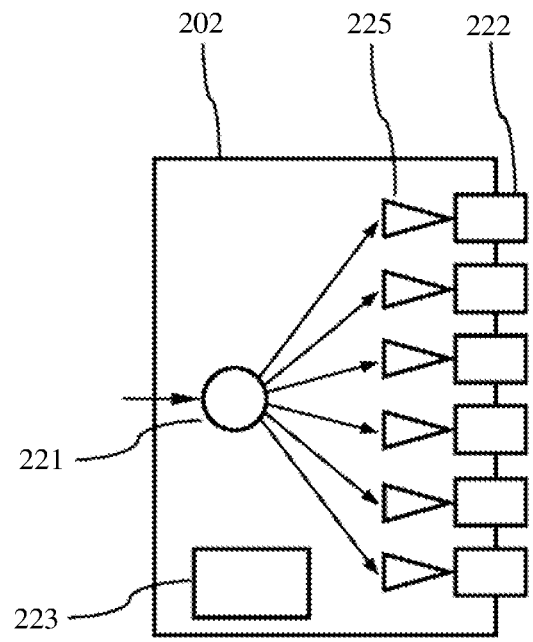
FIG. 8 is an example diagram of still another structure of an optical emission apparatus according to an embodiment of this application.
Figure 9:
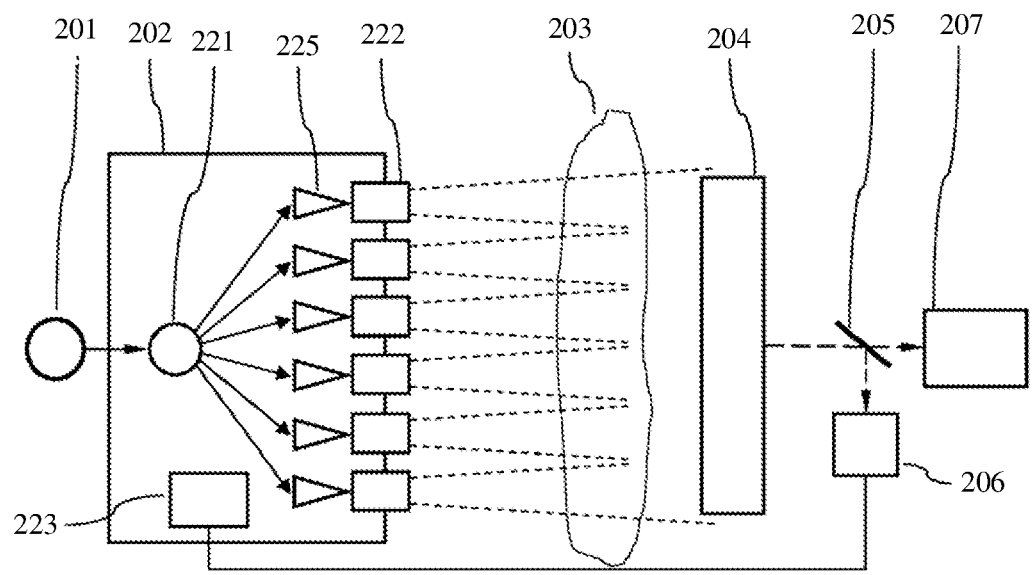
FIG. 9 is a diagram of another architecture of an optical communication system to which the optical emission apparatus in FIG. 8 is applied.

It may be assumed that a quantity of optical amplifiers is the same as a quantity of optical emission units, each quantity is N, and each optical amplifier is connected to one optical emission unit. FIG. 8 is a schematic diagram of a structure of an optical emission apparatus. As shown in FIG. 8, an optical emission apparatus 202 includes a first optical splitter 221, a plurality of optical amplifiers 225, and a plurality of optical emission units 222. Each optical amplifier is connected to one optical emission unit, and further includes an adjustment unit 223, configured to adjust, based on the returned optical power information, the light beams emitted by the N optical emission units. FIG. 9 is a diagram of another architecture in which the optical emission apparatus in FIG. 8 is applied to an optical communication system. A difference between FIG. 9 and FIG. 5 is that the optical amplifier is added.

Optionally, that the optical emission apparatus adjusts the gains of the H optical amplifiers, to change the optical output powers of the light beams emitted by the N optical emission units includes: The optical emission apparatus adjusts a gain of an $h^{th}$ optical amplifier, to change an optical output power of the light beam emitted by the $n^{th}$ optical emission unit, and the optical emission apparatus adjusts a gain of an $(h+1)^{th}$ optical amplifier, to change an optical output power of the light beam emitted by the $(n+1)^{th}$ optical emission unit, where $1 \leq h < H$ and $1 \leq n < N$.

In other words, the optical emission apparatus adjusts gains of two adjacent optical amplifiers. For example, in an embodiment in which both a quantity of optical amplifiers and a quantity of optical emission units are N, numbers of the N optical emission units are from 1 to N, numbers of the N optical amplifiers are from 1 to N, and an optical amplifier whose number is 1 is connected to an optical emission unit whose number is 1. The optical emission unit whose number is 1 and the optical emission unit whose number is 2 are used as an example. The optical emission apparatus adjusts a gain of the optical amplifier whose number is 1, to control the optical power of the optical emission unit 1 to increase, and adjusts a gain of the optical amplifier whose number is 2, to control an optical power of the optical emission unit 2 to decrease by a same power (in other words, a power by which the optical power of the optical emission unit 1 increases). Such adjustment is performed, so that if the optical power of the optical receiving apparatus increases, the power of the optical emission unit 1 continues to increase, and the power of the optical emission unit 2 decreases, until the optical power of the optical receiving apparatus is maximized. The optical emission apparatus sequentially adjusts optical amplifier with the other numbers in an adjustment manner of the optical amplifier whose number is 1 and the optical amplifier whose number is 2, to adjust a power of the optical emission units with the other numbers. For example, the optical emission apparatus sequentially adjusts an optical amplifier who number is 3 and an optical amplifier who number is 4, adjusts an optical amplifier who number is 5 and an optical amplifier who number is 6, . . . , and adjusts an optical amplifier who number is N−1 and an optical amplifier who number is N, until the optical power of the optical receiving apparatus is maximized. For another example, the optical emission apparatus sequentially adjusts an optical amplifier who number is 2 and an optical amplifier who number is 3, adjusts an optical amplifier who number is 4 and an optical amplifier who number is 5 . . . and adjusts an optical amplifier who number is N and an optical amplifier who number is 1, until the optical power of the optical receiving apparatus is maximized. The optical emission unit obtains optical power information of the optical receiving apparatus in real time from the low-speed backhaul channel, to learn, through comparison, of whether the receiving optical power increases after adjustment.

Therefore, in the communication link establishment process, as the turbulence continuously changes, the optical communication system continuously adjusts a gain of each optical amplifier in the optical emission apparatus in a polling manner, to adjust an optical power of each optical emission unit, so that the optical power of entering the optical receiving apparatus is always kept to have a large value, to minimize the impact of the speckle caused by the turbulence.

Alternatively, a plurality of adjacent optical emission units in the N optical emission units may be used as one group, and an optical power of one group of optical emission units is adjusted by group. In other words, optical powers of two adjacent groups of optical emission units are adjusted each time, to accelerate an adjustment rate.

For example, the N optical emission units are grouped into G groups, and the N optical emission units include G groups of optical emission units. Each group of optical emission units may correspond to one optical amplifier. Each of the G groups of optical emission units may include a same quantity of optical emission units, or may include a different quantity of optical emission units. This is not limited in embodiments of this application. For example, the N optical emission units may be evenly grouped into G groups, and each group includes adjacent optical emission units and includes a same quantity of adjacent optical emission units. For another example, the N optical emission units may be grouped into G groups, and quantities of adjacent optical emission units included in all groups may be partially the same and partially different, or may all be different.

Optionally, the optical emission apparatus adjusts the gain of the $h^{th}$ optical amplifier, to change an optical output power of a light beam emitted by a $g^{th}$ group of optical emission units, and the optical emission apparatus adjusts the gain of the $(h+1)^{th}$ optical amplifier, to change an optical output power of a light beam emitted by a $(g+1)^{th}$ optical emission unit, where $1 \le h < H$ and $1 \le g < G$.

In other words, the optical emission apparatus sequentially adjusts optical powers of the G groups of optical emission units. The optical emission apparatus adjusts a power of each group of optical emission units. For example, it may be assumed that the N optical emission units are grouped into G groups, and group numbers are sequentially from 1 to g. An optical emission unit whose group number is 1 is used as an example. The optical emission apparatus adjusts a gain of an optical amplifier corresponding to the group 1 of optical emission units, to control the optical power of the group 1 of optical emission units to increase, and adjusts a gain of an optical amplifier corresponding to a group 2 of optical emission units, to control the optical power of the group 2 of optical emission units to decrease by a same optical power. Such adjustment is performed, so that if the optical power of the optical receiving apparatus increases, the optical power of the group 1 of optical emission units increases, and the optical power of the group 2 of optical emission units decreases; and if the optical power of the optical receiving apparatus decreases, the optical power of the group 2 of optical emission units increases, and the optical power of the group 1 of optical emission units decreases, until the optical power of the optical receiving apparatus is maximized. The optical emission apparatus sequentially adjusts optical powers of optical emission units whose group numbers are from 2 to g in an adjustment manner of the optical emission unit whose group number is 1 and an optical emission unit whose group number is 2.

Therefore, the gain of each optical amplifier is adjusted in real time, to adjust the optical power of the optical emission unit, so that the receiving optical power of the optical receiving apparatus is maximized, to suppress the impact exerted by the speckle.

It can be understood that, for an implementation in which the optical emission apparatus includes the amplifier, the optical amplifier may be implemented independently, or may be implemented in combination with Manner 1 or Manner 2. This is not limited in embodiments of this application.

In an implementation, for a manner in which the optical emission apparatus adjusts the beam angle of the optical emission unit, the optical amplifier may be further added to the optical emission apparatus to adjust the gain. In other words, the optical emission apparatus includes at least one optical amplifier and a plurality of optical emission units whose beam angles are adjustable. Certainly, in the optical emission apparatus, one optical amplifier may be connected to one or more optical emission units whose beam angles are adjustable. This is not specifically limited in embodiments of this application.

Figure 10:
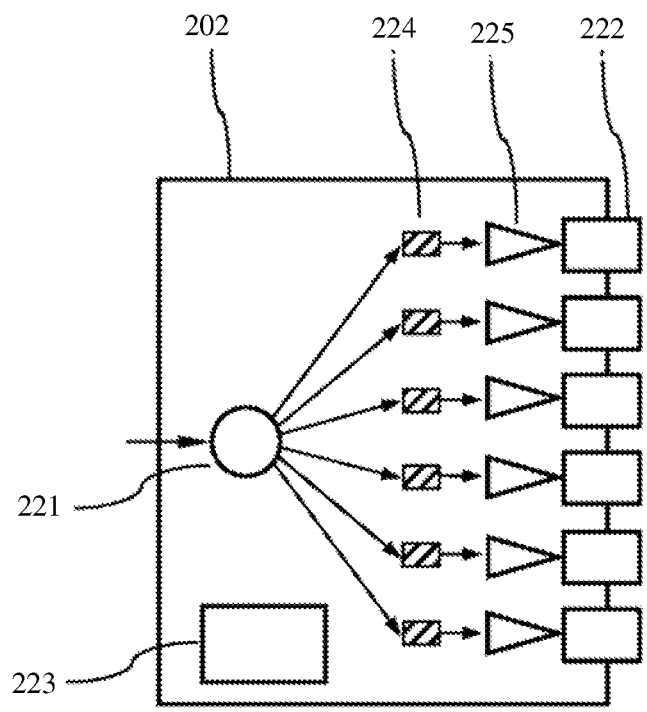
FIG. 10 is an example diagram of yet another structure of an optical emission apparatus according to an embodiment of this application.

In another implementation, for a manner in which the optical emission apparatus adjusts the phase of the optical emission unit, the optical amplifier may be further added to the optical emission apparatus to adjust the gain. In other words, the optical emission apparatus includes at least one optical amplifier and at least one phase modulator. In the optical emission apparatus, one optical amplifier may be connected to one or more phase modulators. This is not specifically limited in embodiments of this application. For ease of understanding. FIG. 10 is an example diagram of an optical emission apparatus according to an embodiment. As shown in FIG. 10, an optical emission apparatus 202 includes a first optical splitter 221, a plurality of amplifiers 225, a plurality of phase modulators 224, and a plurality of optical emission units 222, and further includes an adjustment unit 223, configured to adjust, based on returned optical power information, the light beams emitted by the N optical emission units. Each phase modulator is connected to an optical emission unit by using an optical amplifier. It can be understood that FIG. 10 is merely an example, and constitutes no limitation on embodiments of this application (for example, a quantity of optical amplifiers or a location is not specifically limited in embodiments of this application). z For example, the optical amplifier may alternatively be located before the phase modulator. In other words, a light beam output by the first optical splitter arrives at the optical amplifier and then, arrives at the phase modulator.

In the foregoing various manners, the optical emission apparatus adjusts a beam angle and/or a phase of each optical emission unit in real time (and may further adjust the gain), so that energy of a spot arriving at the optical receiving apparatus is more concentrated, the optical power received by the optical receiving apparatus is always kept to have a large value, and the problem of the speckle is effectively resolved.

The following describes an optical emission unit whose beam angle is adjustable and that is applied to this embodiment of this application. In this embodiment of this application, in an embodiment in which the beam angle is adjusted, the following described optical emission unit whose beam angle is adjustable may be used. For example, in Manner 1, the optical emission unit whose beam angle is adjustable may be used.

Optionally, the optical emission unit whose beam angle is adjustable may include a driving apparatus, a tail fiber, and a lens. The driving apparatus is connected to the tail fiber, and is configured to push the tail fiber to change a location of the tail fiber, to adjust a beam angle of the optical emission unit: a light beam output by the tail fiber arrives at the lens; and the lens is configured to expand the light beam output by the tail fiber.

A specific implementation of how the beam angle of the optical emission unit deflects is not limited in embodiments of this application. Optionally, the driving apparatus may push or adjust the location of the tail fiber by using a driving apparatus such as a mechanical driving structure, a motor, an MEMS, or a piezoelectric structure, to deflect the beam angle. For example, the optical emission unit may be fastened on a mechanical structure whose angle may rotate in two dimensions, and a motor controls the mechanical structure to perform two-dimensional deflection, to implement two-dimensional deflection of the beam angle of the optical emission unit. It can be understood that deflection of the beam angle is merely an example, but does not constitute a limitation. A person skilled in the art may also implement deflection of the beam angle of the optical emission unit in another manner.

For example, it may be assumed that the driving apparatus is a piezoelectric driver. In Manner 1 in this application, each optical emission unit may include a fiber (or referred to as a tail fiber), a piezoelectric driver, and a lens. The optical emission unit including the fiber, the piezoelectric driver, and the lens adjusts the piezoelectric driver to move the fiber, so that a light exit direction of the optical emission unit can change, in other words, the beam angle of the optical emission unit can be adjusted. If a piezoelectric driver is used as the driving apparatus, each optical emission unit may include at least three piezoelectric drivers, to push the fiber in four directions: an upward direction, a downward direction, a leftward direction, and a rightward direction.

The piezoelectric driver may be placed near an end face of the fiber, and the piezoelectric driver may be controlled, based on a change in a voltage, to push the fiber to move in two dimensions in a plane perpendicular to a central axis of the lens. Therefore, two-dimensional angle deflection may be implemented for spatial light obtained after the lens performs reshaping. For example, the piezoelectric driver is in close contact with the tail fiber and close to the light exit end face of the tail fiber, and is configured to push the tail fiber to change a location of a light exit end face of the tail fiber. The lens is located in a direction of the light exit end face of the tail fiber, and is configured to expand the light beam output by the tail fiber.

Figure 11:
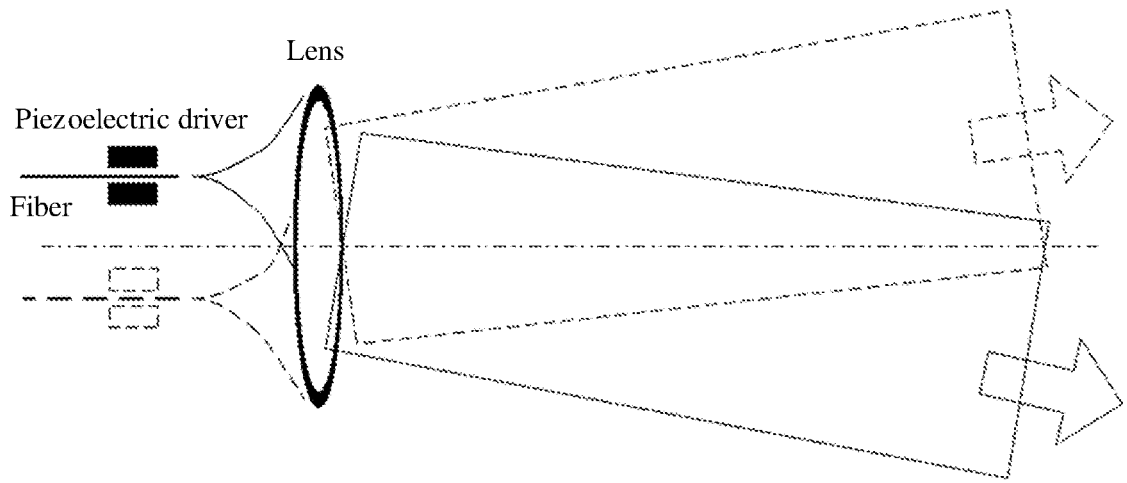
FIG. 11 is a schematic diagram of an operating principle of an optical emission unit including a fiber, a piezoelectric driver, and a lens.

FIG. 11 is a schematic diagram of an operating principle of an optical emission unit including a fiber, a piezoelectric driver, and a lens. Light emitted by the fiber is incident to the lens along a direction parallel to a central axis of the lens, and then reshaped by the lens into a spatial light beam with a large waist and a long transmission distance. When the light emitted by the fiber is incident along the central axis of the lens, the spatial light obtained after the lens performs reshaping is emitted along the central axis: when the light emitted by the fiber is incident to the lens from an upper part of the central axis of the lens, the spatial light obtained after the lens performs reshaping is deflected downward; and when the light emitted by the fiber is incident to the lens from a lower part of the central axis of the lens, the spatial light obtained after the lens performs reshaping is deflected upward.

This application is applied to a space optical communication scenario. Usually, a distance between an optical emission apparatus and an optical receiving apparatus is long, a beam angle of an optical emission unit in the optical emission apparatus requires a small adjustment range, and has a high precision requirement, and a piezoelectric driver has a large driving force and precise control, and can meet a requirement of the optical emission unit. In addition to the piezoelectric driver, another apparatus or element that may push the fiber to move in two dimensions in a plane perpendicular to the axis of the lens may also be applied to this application. This is not specifically limited in embodiments of this application.

Figure 12:
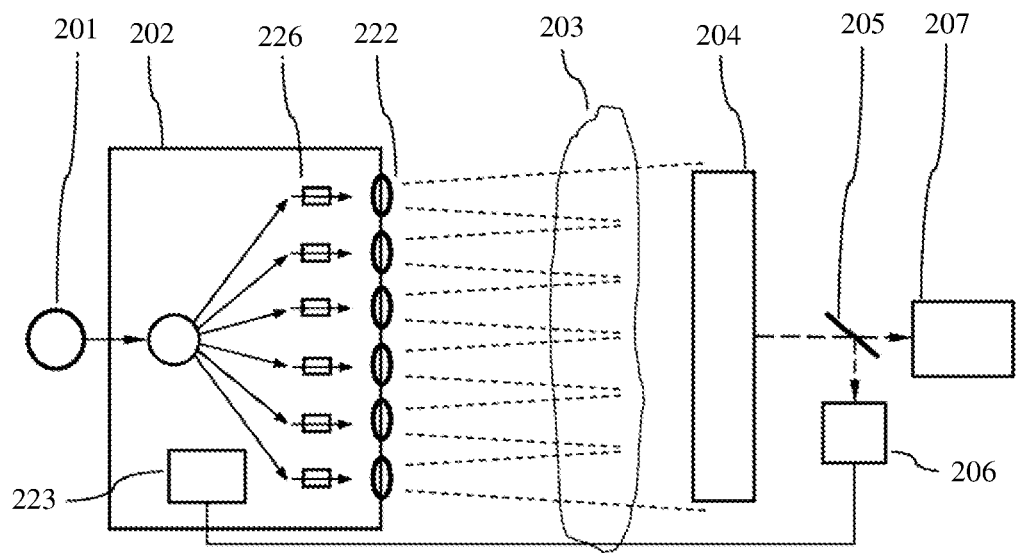
FIG. 12 is another example diagram of an optical communication system according to an embodiment of this application.

FIG. 12 is another example diagram of an optical communication system according to an embodiment of this application. A difference between the optical emission unit in FIG. 12 and the optical emission unit in FIG. 5 lies in that each optical emission unit includes a fiber, a piezoelectric driver, and a lens.

It can be understood that, for some descriptions of the optical communication system in FIG. 5, FIG. 7, FIG. 9, or FIG. 12, reference may be made to related descriptions in FIG. 2. For brevity, details are not described again.

Figure 13:
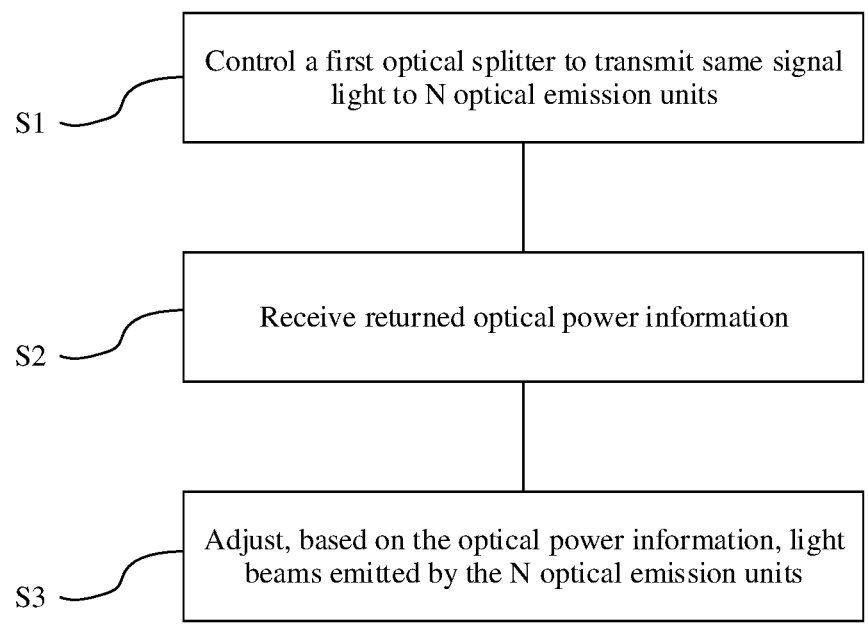
FIG. 13 is a schematic flowchart of an optical communication method according to an embodiment of this application.

FIG. 13 is a schematic flowchart of an optical communication method according to some embodiments of this application. The optical communication method may be performed by an optical transceiver apparatus, an optical emission apparatus, or an optical communication system. As shown in FIG. 13, the optical communication method includes the following steps.

S1: Control a first optical splitter to transmit same signal light to N optical emission units, where the N optical emission units output the signal light from the first optical splitter, to obtain light beams distributed based on a preset proportion, and N is an integer greater than 1.

S2: Receive returned optical power information.

S3: Adjust, based on the optical power information, N light beams emitted by the N optical emission units.

Optionally, the adjusting N light beams emitted by the N optical emission units includes adjusting beam angles of the light beams emitted by the N optical emission units.

Optionally, the adjusting N light beams emitted by the N optical emission units includes adjusting phases of the light beams emitted by the N optical emission units.

Optionally; the adjusting N light beams emitted by the N optical emission units further includes adjusting gains of the light beams emitted by the N optical emission units.

For a specific adjustment manner, reference may be made to the descriptions above. For brevity, details are not described herein again.

This application further provides a computer-readable medium configured to store a computer program. The computer program includes instructions used to perform the optical communication method.

It should be understood that various numerical numbers in this specification are merely distinguished for ease of description and are not intended to limit the scope of this application.

It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in embodiments disclosed in this specification, steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described method, reference may be made to a corresponding process in the foregoing apparatus embodiments, and details are not described herein again.

All or some of the foregoing embodiments may be implemented by using software, hardware, firmware, or any combination thereof.

When software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical emission apparatus, comprising: a first optical splitter, N optical emission units, wherein N is an integer greater than 1, and an adjustment unit;

the first optical splitter is configured to receive signal light and transmit respective parts of the received signal light to each of the N optical emission units;

the N optical emission units are configured to emit, based on the respective parts of the signal light received from the first optical splitter, light beams distributed based on a preset proportion that provides a higher optical power of the received signal light to one or more optical emission units in a center of the N optical emission units than to others of the N optical emission units; and the adjustment unit is configured to adjust, based on returned optical power information received on a backhaul channel from a device external to the optical emission apparatus, the light beams emitted by the N optical emission units.

2. The optical emission apparatus according to claim 1, wherein the first optical splitter is configured to divide the signal light into N parts based on the preset proportion, and transmit each of the N parts to a respective optical emission unit of the N optical emission units, wherein the preset proportion is determined based on a preset model.

3. The optical emission apparatus according to claim 1, wherein the adjusting the light beams emitted by the N optical emission units comprises:

adjusting, by the adjustment unit, beam angles of the light beams emitted by the N optical emission units.

4. The optical emission apparatus according to claim 3, wherein the adjusting, by the adjustment unit, the beam angles of the light beams emitted by the N optical emission units comprises:

adjusting, by the adjustment unit, a beam angle of an $n^{th}$ optical emission unit of the N optical emission units in a first direction, and adjusting, by the adjustment unit, the beam angle of the $n^{th}$ optical emission unit of the N optical emission units in a second direction, wherein $1 \leq n < N$, and the first direction is perpendicular to the second direction; and adjusting, by the adjustment unit, a beam angle of an $(n+1)^{th}$ optical emission unit of the N optical emission units in a third direction, and adjusting, by the adjustment unit, the beam angle of the $(n+1)^{th}$ optical emission unit of the N optical emission units in a fourth direction, wherein the third direction is perpendicular to the fourth direction.

5. The optical emission apparatus according to claim 3, wherein each of the N optical emission units comprises a driving apparatus, a tail fiber, and a lens;

the driving apparatus of an optical emission unit of the N optical emission units is connected to the tail fiber, and is configured to push the tail fiber to change a location of the tail fiber, to adjust a beam angle of the optical emission unit; and a light beam output by the tail fiber reaches the lens, and the lens is configured to expand the light beam output by the tail fiber.

6. The optical emission apparatus according to claim 3, wherein the optical emission apparatus further comprises H optical amplifiers, and each optical amplifier of the H optical amplifiers is connected to one or more of the N optical emission units, wherein H is an integer greater than or equal to 1; and wherein the adjusting, by the adjustment unit, the beam angles of the light beams emitted by the N optical emission units comprises:

adjusting, by the adjustment unit, gains of the H optical amplifiers to change optical output powers of the light beams emitted by the N optical emission units.

7. The optical emission apparatus according to claim 6, wherein the adjusting, by the adjustment unit, the gains of the H optical amplifiers comprises:

adjusting, by the adjustment unit, a gain of an $h^{th}$ optical amplifier of the H optical amplifiers to change an optical output power of the light beam emitted by the $n^{th}$ optical emission unit of the N optical emission units, and the optical emission apparatus is configured to adjust a gain of an $(h+1)^{th}$ optical amplifier of the H optical amplifiers, to change an optical output power of a light beam emitted by the $(n+1)^{th}$ optical emission unit of the N optical emission units, wherein $1 \leq h < H$ and $1 \leq n < N$.

8. The optical emission apparatus according to claim 1, further comprising L phase modulators, and each phase modulator of the L phase modulators is connected to at least one optical emission unit of the N optical emission units, wherein L is an integer greater than or equal to 1; and wherein the adjustment unit is further configured to adjust the L phase modulators to change phases of the light beams emitted by the N optical emission units.

9. The optical emission apparatus according to claim 8, wherein that the adjustment unit is further configured to adjust the L phase modulators comprises:

the adjustment unit is further configured to adjust an $l^{th}$ phase modulator of the L phase modulators, to adjust a phase of a light beam of an $n^{th}$ optical emission unit of the N optical emission units, wherein $1 \leq l \leq L$ and $1 \leq n \leq N$.

10. An optical transceiver apparatus, comprising an optical emission apparatus, and further comprising: an optical receiving apparatus, a second optical splitter, and a photodetector;

the optical receiving apparatus is configured to receive a light beam emitted by a peer-end optical transceiver apparatus, and transmit the light beam to the second optical splitter;

the second optical splitter is configured to perform an optical split on the light beam transmitted by the optical receiving apparatus, and transmit, to the photodetector, a first partial light beam obtained after the optical split; and the photodetector is configured to detect an optical power of the first partial light beam, and return optical power information over a backhaul channel to the peer-end optical transceiver apparatus;

wherein the optical emission apparatus comprises a first optical splitter, N optical emission units, wherein N is an integer greater than 1, and an adjustment unit;

the first optical splitter is configured to receive signal light and transmit respective parts of the received signal light to each of the N optical emission units;

the N optical emission units are configured to emit, based on the respective parts of the signal light received from the first optical splitter, light beams distributed based on a preset proportion that provides a higher optical power of the received signal light to one or more optical emission units in a center of the N optical emission units than to others of the N optical emission units; and the adjustment unit is configured to adjust, based on returned optical power information on the backhaul channel, the light beams emitted by the N optical emission units.

11. The optical transceiver apparatus according to claim 10, wherein the first optical splitter is configured to divide the signal light into N parts based on the preset proportion, and transmit each of the N parts to a respective optical emission unit of the N optical emission units, wherein the preset proportion is determined based on a preset model.

12. The optical transceiver apparatus according to claim 10, wherein the adjusting the light beams emitted by the N optical emission units comprises:

adjusting, by the adjustment unit, beam angles of the light beams emitted by the N optical emission units.

13. The optical transceiver apparatus according to claim 12, wherein the adjusting, by the adjustment unit, the beam angles of the light beams emitted by the N optical emission units comprises:

adjusting, by the adjustment unit, a beam angle of an $n^{th}$ optical emission unit of the N optical emission units in a first direction, and adjusting, by the adjustment unit, the beam angle of the $n^{th}$ optical emission unit of the N optical emission units in a second direction, wherein $1 \leq n < N$, and the first direction is perpendicular to the second direction; and adjusting, by the adjustment unit, a beam angle of an $(n+1)^{th}$ optical emission unit of the N optical emission units in a third direction, and adjusting, by the adjustment unit, the beam angle of the $(n+1)^{th}$ optical emission unit of the N optical emission units in a fourth direction, wherein the third direction is perpendicular to the fourth direction.

14. An optical communication system, comprising an optical emission apparatus, and further comprising: an optical receiving apparatus, a second optical splitter, and a photodetector;

the optical receiving apparatus is configured to receive the signal light emitted by the optical emission apparatus, and transmit the signal light to the second optical splitter;

the second optical splitter is configured to perform an optical split on the light beam, and transmit, to the photodetector, a first partial light beam obtained after the optical split; and the photodetector is configured to detect an optical power of the first partial light beam obtained by the second optical splitter through the split, and return optical power information on a backhaul channel to the optical emission apparatus;

wherein the optical emission apparatus comprises a first optical splitter, N optical emission units, wherein N is an integer greater than 1, and an adjustment unit;

the first optical splitter is configured to receive signal light and transmit respective parts of the received signal light to each of the N optical emission units;

the N optical emission units are configured to emit, based on the respective parts of the signal light received from the first optical splitter, light beams distributed based on a preset proportion that provides a higher optical power of the received signal light to one or more optical transmission units in a center of the N optical transmission units than to others of the N optical transmission units; and the adjustment unit is configured to adjust, based on returned optical power information received on the backhaul channel, the light beams emitted by the N optical emission units.

15. The optical communication system according to claim 14, wherein the first optical splitter is configured to divide the signal light into N parts based on the preset proportion, and transmit each of the N parts to a respective optical emission unit of the N optical emission units, wherein the preset proportion is determined based on a preset model.

16. The optical communication system according to claim 14, wherein the adjusting the light beams emitted by the N optical emission units comprises:
adjusting, by the adjustment unit, beam angles of the light beams emitted by the N optical emission units.

17. An optical communication method, comprising:
controlling a first optical splitter to receive signal light and to transmit respective parts of the received signal light to each of N optical emission units, wherein the N optical emission units emit, based on the signal light from the first optical splitter, light beams distributed based on a preset proportion that provides a higher optical power of the received signal light to each of one or more optical emission units in a center of the N optical emission units than to others of the N optical emission units, and N is an integer greater than 1;
receiving returned optical power information; and
adjusting, based on the optical power information received on a backhaul channel from a device external to the optical emission apparatus, the light beams emitted by the N optical emission units.

18. The method according to claim 17, wherein the adjusting the light beams emitted by the N optical emission units comprises adjusting beam angles of the light beams emitted by the N optical emission units.

19. The method according to claim 18, wherein the adjusting the light beams emitted by the N optical emission units further comprises adjusting gains of the light beams emitted by the N optical emission units.

20. The method according to claim 17, wherein the adjusting the light beams emitted by the N optical emission units comprises adjusting phases of the light beams emitted by the N optical emission units.

* * * * *